United States Patent
Swanick

(10) Patent No.: US 6,688,064 B1
(45) Date of Patent: Feb. 10, 2004

(54) BREAK RESISTANT GLASS DOOR ASSEMBLY

(75) Inventor: John V. Swanick, Gladwin, MI (US)

(73) Assignee: Taylor Building Products, Inc., West Branch, MI (US)

( * ) Notice: Subject to any disclaimer, the term of this patent is extended or adjusted under 35 U.S.C. 154(b) by 0 days.

(21) Appl. No.: 10/158,794

(22) Filed: May 31, 2002

(51) Int. Cl.[7] .................................. E06B 3/70
(52) U.S. Cl. ............... 52/455; 52/784.1; 52/800.13; 52/800.14
(58) Field of Search .................. 52/455, 784.1, 52/800.13, 800.14

(56) References Cited

U.S. PATENT DOCUMENTS 6,320,276 B1 * 11/2001 Sauer .................. 307/10.1
6,434,898 B1 * 8/2002 Ward et al. ................ 52/455

* cited by examiner

Primary Examiner—Carl D. Friedman
Assistant Examiner—Nahid Amiri
(74) Attorney, Agent, or Firm—Richard M. Goldberg

(57) ABSTRACT

A break resistant glass door assembly, includes a door having an opening therein; a glass assembly including a laminate safety glass assembly formed by a clear plastic sheet sandwiched between first and second panes of glass; inner and outer trim members which clamp the safety glass assembly and door at the opening, to hold the safety glass assembly in the opening of the door; and a rigid U-shaped cap secured to the door around the opening.

10 Claims, 8 Drawing Sheets

BREAK RESISTANT GLASS DOOR ASSEMBLY

BACKGROUND OF THE INVENTION

The present invention relates generally to doors having glass inserts, and more particularly, is directed to a break resistant glass door assembly.

Glass door assemblies are well known. Such glass door assemblies provide an aesthetic look while also increasing light entry into a room. However, in certain areas of the United States, for example, Dade County in Florida, outside doors must satisfy certain structural and break resistant requirements by passing various tests. Specifically, a first test that must be passed is an impact test (PA201). In this test, a nine pound 2"×4" piece of wood is shot out of a canon at 34 mph at the glass in the door. If the glass does not break, the door has passed the test. This is the equivalent of 130 mph hurricane winds, that is, a category three hurricane. A second test that must be passed is a structural test (PA202). This is a test of air infiltration, water infiltration and load. In this test, a vacuum is applied to the door to apply a predetermined force (lbs./ft$^2$), and it is determined if there is any air or water leakage, or any structural damage. A third test that must be passed is a cycle test (PA203). In this test, a vacuum is rapidly applied and released in a number of cycles, for example, 9,000 cycles, with 4,500 cycles on each side. To date, no glass door assembly has passed all three tests in Dade County, except a glass door assembly according to the present invention in February, 2002.

SUMMARY OF THE INVENTION

Accordingly, it is an object of the present invention to provide a break resistant glass door assembly that overcomes the problems with the aforementioned prior art.

It is another object of the present invention to provide a break resistant glass door assembly that can pass Dade County tests PA201, PA202 and PA203.

It is still another object of the present invention to provide a break resistant glass door assembly which has good structural integrity and can withstand category three hurricane winds.

It is a further object of the present invention to provide a break resistant glass door assembly that is easy and economical to manufacture.

In accordance with an aspect of the present invention, a break resistant glass door assembly, includes a door having an opening therein; a glass assembly including a laminate safety glass assembly formed by a clear plastic sheet sandwiched between first and second panes of glass; inner and outer trim members which clamp the safety glass assembly and door at the opening, to hold the safety glass assembly in the opening of the door; and a rigid U-shaped cap secured to the door around the opening.

The U-shaped cap includes a flush section which sits flush against the door around the opening, and two parallel, spaced apart, flange sections extending outwardly from opposite lengthwise edges of the flush section and which fit around front and back faces of the door at the opening. More specifically, the door includes a face sheet and a back sheet secured together to define a cavity therein, and a molded foam core in the cavity; one flange section extends between the face sheet and the molded foam core; and the other flange section extends between the back sheet and the molded foam core. Further, the U-shaped cap is formed from different sections, at least some of the sections including an inturned tab for fitting within other ones of the sections. Preferably, the U-shaped cap is made from a steel material.

The glass assembly further includes at least one pane of glass separated from the safety glass assembly by a gap which is hermetically sealed by a first peripheral seal. Further, the glass assembly further preferably includes a second peripheral seal to an outside of the first peripheral seal for ensuring that the gap remains hermetically sealed in the event of failure of the first peripheral seal.

The inner and outer trim members each include a central leg facing each other and positioned in the opening between the glass assembly and the door assembly; a first clamping member for clamping an exposed surface of the door assembly; and a second clamping member for clamping an exposed surface of the glass assembly. A screw extends through the central leg of one of the inner and outer trim members and into the central leg of the other of the inner and outer trim members to secure the trim members together in a clamping relation around the door assembly and the glass assembly. Each of the inner and outer trim members preferably has a substantially T-shaped cross-sectional configuration.

The above and other objects, features and advantages of the invention will become readily apparent from the following detailed description thereof which is to be read in connection with the accompanying drawings.

DETAILED DESCRIPTION

Figure 1:
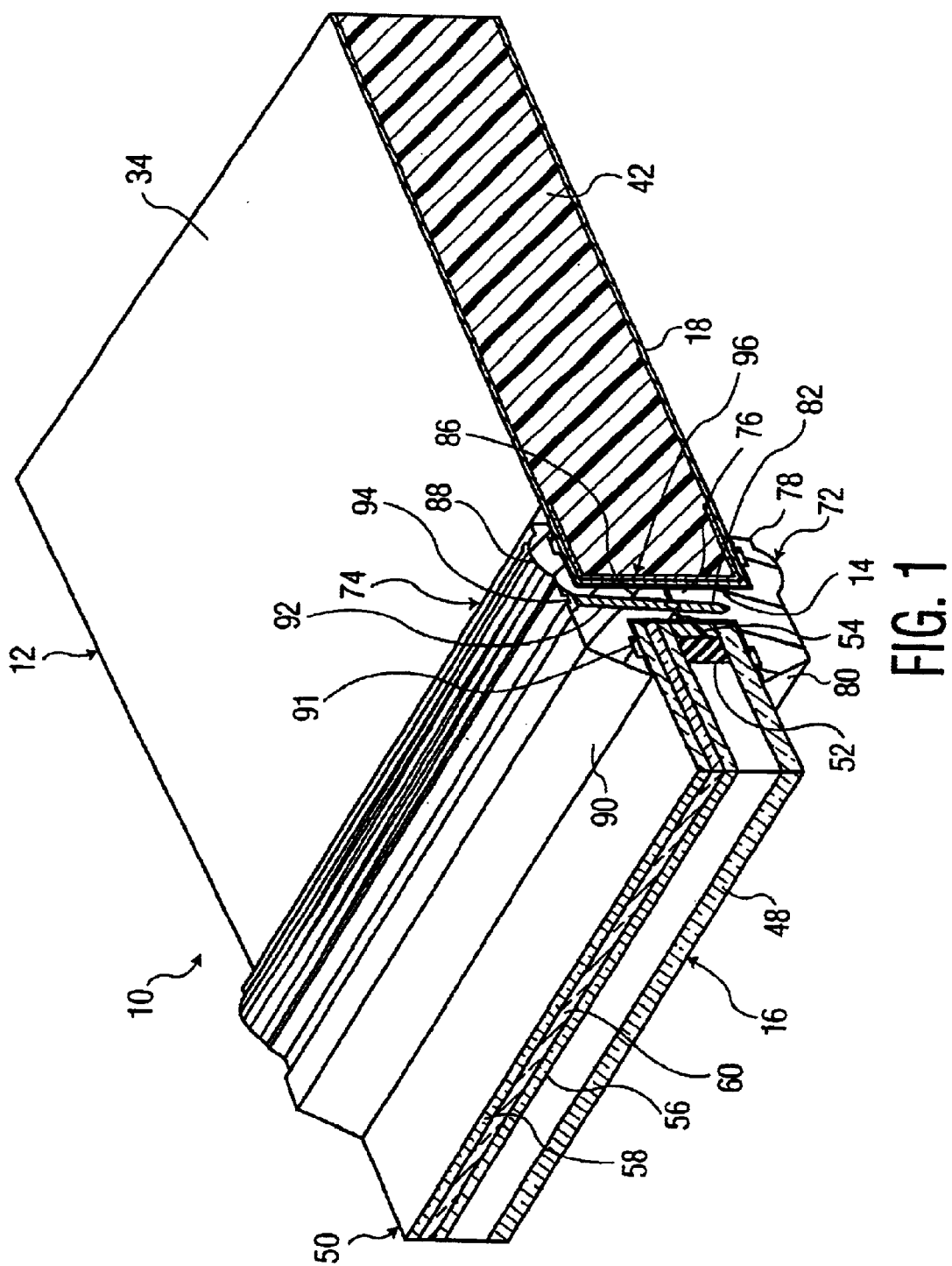
FIG. 1 is a cross-sectional view of a break resistant glass door assembly according to the present invention.

Referring to the drawings in detail, and initially to FIGS. 1–10, a break resistant glass door assembly 10 according to the present invention includes a door assembly 12 having an opening 14 in which a glass assembly 16 is secured.

Specifically, door assembly 10 includes a face sheet 18 made of steel or other metal, for example, a hot dipped galvanized steel having a thickness in the range of about 0.0200 inch to 0.0400 inch, and more preferably, 0.0240 inch to 0.0300 inch, and having a baked on polyester prime finish. Face sheet 18 is shown having a rectangular configuration, although the present invention is not limited thereby, and face sheet 18 can have any other suitable configuration such as a rounded top edge, etc., depending upon the final shape of door assembly 10. Face sheet 18 includes a rectangular planar sheet portion 20 and a rectangular peripheral flange 22 extending outwardly from the periphery of planar sheet portion 20.

Figure 5:
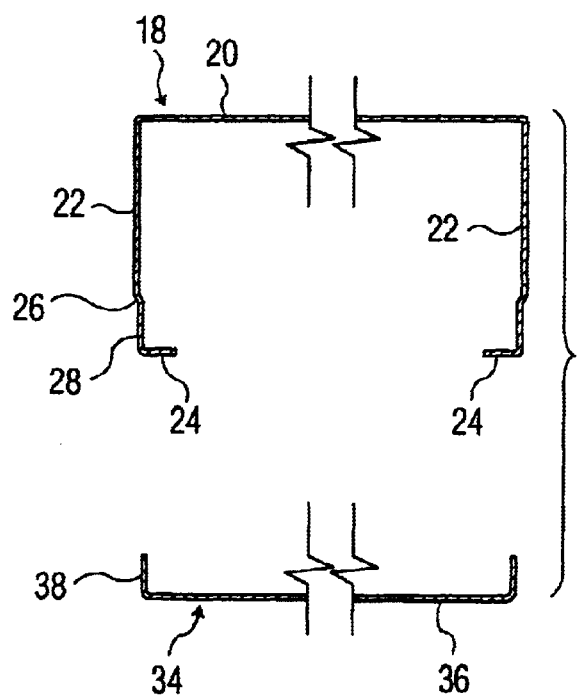
FIG. 5 is a cross-sectional view of the face sheet and back sheet of the steel door skin, taken along a widthwise edge thereof.
Figure 6:
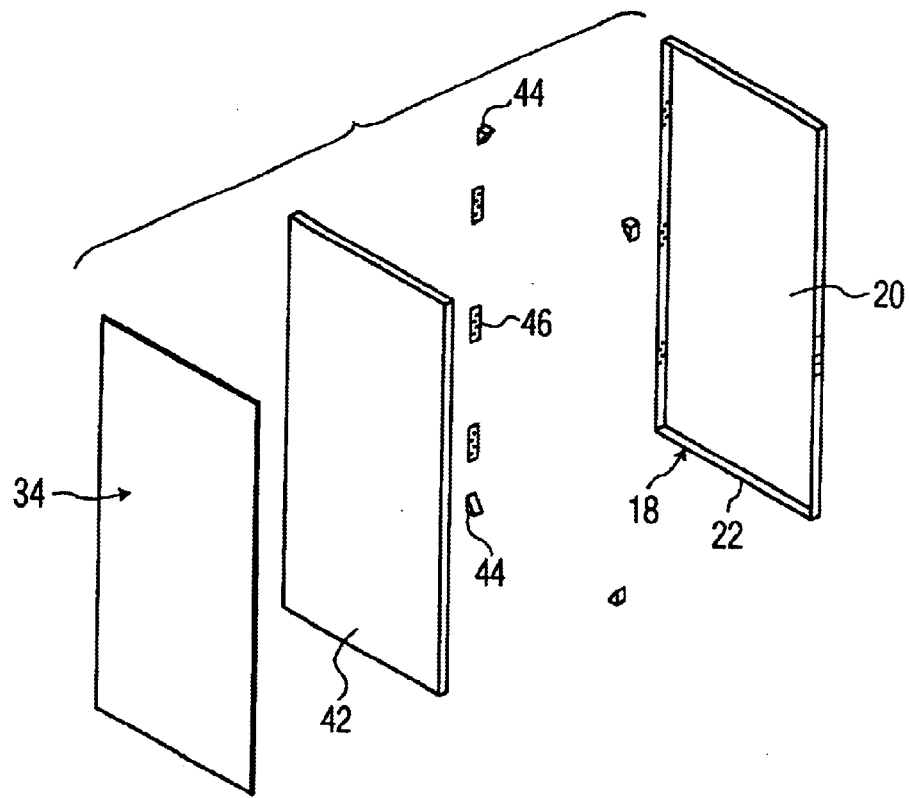
FIG. 6 is an exploded, perspective view of the door assembly prior to cutting out the opening for the glass.

Flange 22 has an inwardly turned lip 24 at the free end thereof and which extends around the entire rectangular flange 22. In the upper and lower widthwise extending edges of flange 22, as shown in FIG. 5, there is a slight inwardly extending bend 26 which produces an offset portion 28 at the free end of flange 22 to which lip 24 is connected. Offset portion 28 is parallel with the remainder of flange 22 but offset inwardly therefrom as a result of bend 26.

Figure 4:
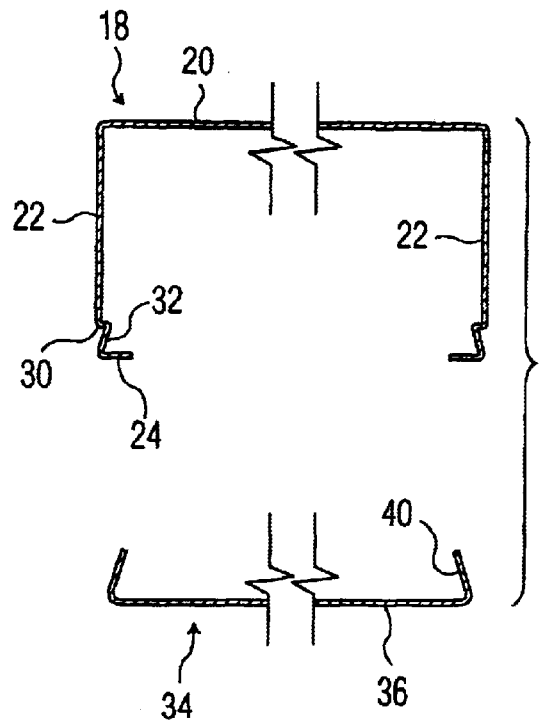
FIG. 4 is a cross-sectional view of the face sheet and back sheet of the steel door skin, taken along a lengthwise edge thereof.

In the left and right lengthwise extending edges of flange 22, as shown in FIG. 4, there is a larger inwardly extending bend 30 which produces an offset portion 32 at the free end of flange 22 to which lip 24 is connected. Offset portion 32 is angled with respect to the remainder of flange 22 but offset inwardly therefrom as a result of bend 26.

Door assembly 10 further includes a back sheet 34 made of steel or other metal, for example, a hot dipped galvanized steel having a thickness in the range of about 0.0200 inch to 0.0400 inch, and more preferably, 0.0240 inch to 0.0300 inch, and having a baked on polyester prime finish. Back sheet 34 has the same configuration as face sheet 18. Back sheet 34 includes a rectangular planar sheet portion 36 and a rectangular peripheral flange 38 extending outwardly from the periphery of planar sheet portion 36.

Flange 38 has an inwardly turned lip 40 at the free end thereof and which extends around the entire rectangular flange 38. In the upper and lower widthwise extending edges of flange 38, as shown in FIG. 5, lip 40 extends perpendicular to planar sheet portion 36, and is adapted to engage the outer surface of offset portion 28 in a snug manner.

In like manner, in the left and right lengthwise extending edges of flange 38, as shown in FIG. 4, inwardly turned lip 40 extends inwardly at an angle to planar sheet portion 36, and is adapted to engage the outer surface of offset portion 32 in a snug manner. Thereafter, face sheet 18 and back sheet 34 are secured together by a hot melt glue.

When face sheet 18 and back sheet 34 are assembled together, there is a hollow cavity formed therein. This hollow cavity is filled with a foam material, for example, the rigid foam sold by Bayer AG of Leverkusen, Germany under the trademark "BAYTHERM." When the foam hardens, it forms a molded foam core 42 between face sheet 18 and back sheet 34 which also adheres to face sheet 18 and back sheet 34 in order to form a rigid door assembly 12. In addition, the foam acts as an adhesive with respect to face sheet 18 and back sheet 34. Prior to supplying the foam, triangular shaped, compressible foam corners 44 are inserted into the corners of face sheet 18 to prevent the foam material from leaking out. Hinge plates 46 are also adhered to the outer surface of flange 22 of face sheet 18.

It will be appreciated, however, that the present invention is not limited to this particular door assembly 12, and any other suitable door assembly can be used, for example, a wood door, PVC door, aluminum door, etc.

Figure 7:
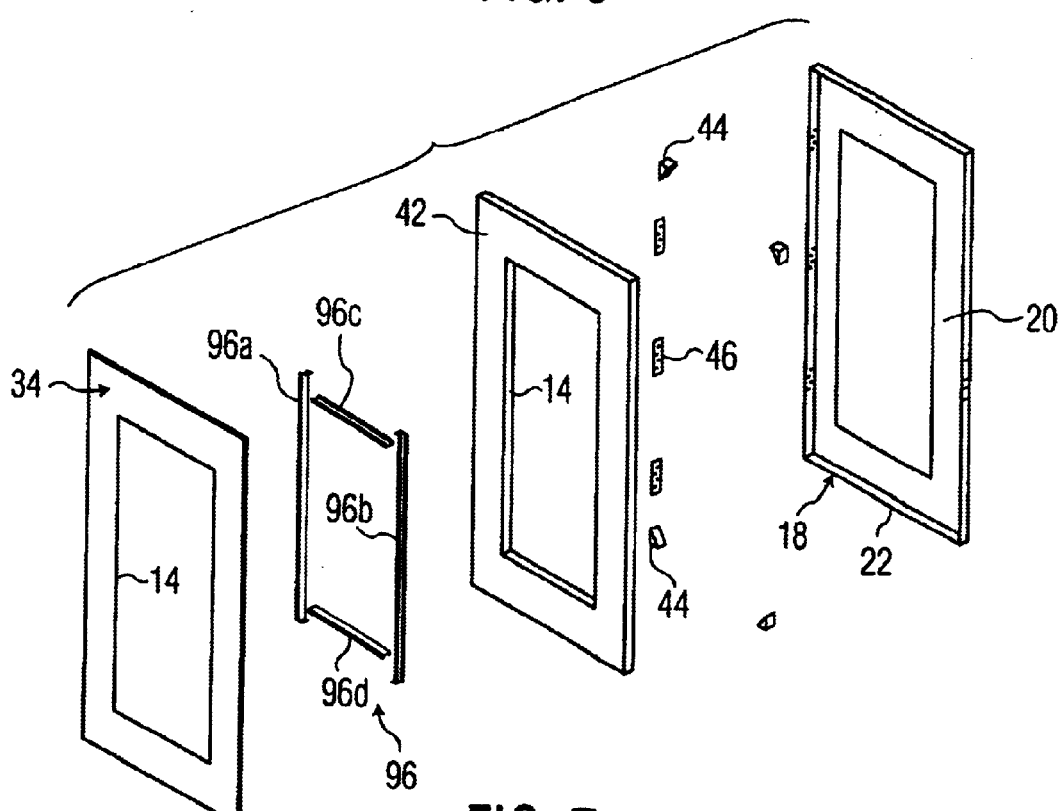
FIG. 7 is an exploded, perspective view of the door assembly after cutting out the opening for the glass.
Figure 8:
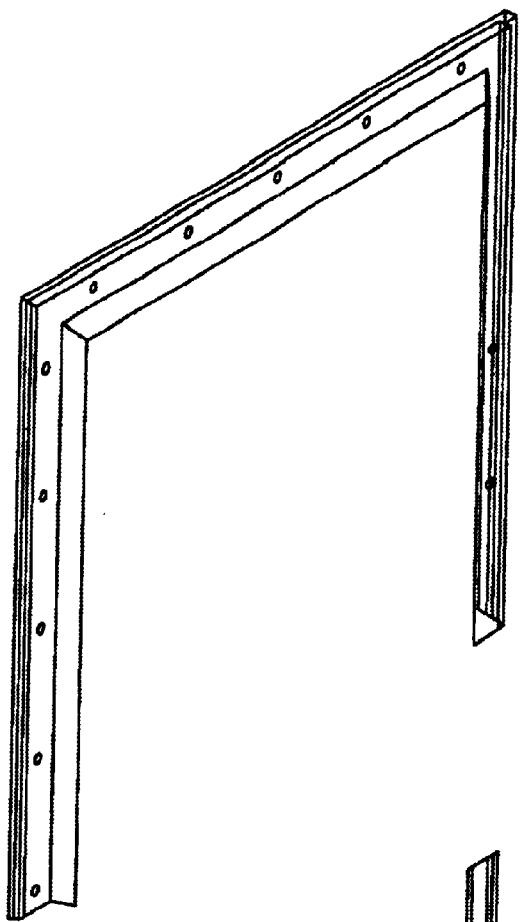
FIG. 8 is a perspective view of the inner trim member of the break resistant glass door assembly.
Figure 8:
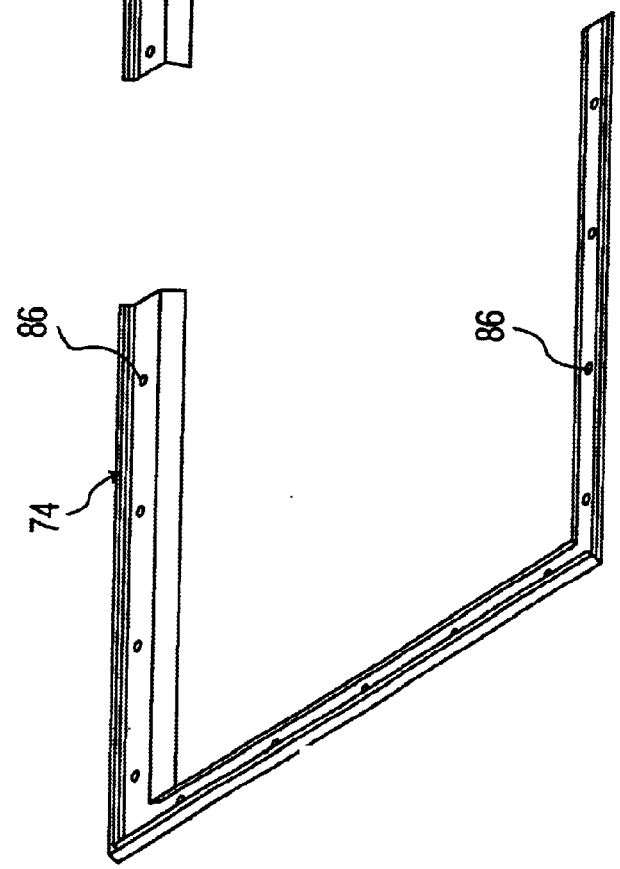

Thereafter, door assembly 12 is cut out to form central opening 14, as shown in FIG. 7, through face sheet 18, molded foam core 42 and back sheet 34. Although central opening 14 is shown as having a rectangular configuration, the present invention is not limited thereby, and it can have any suitable configuration, such as circular, oval, square, etc.

Figure 2:
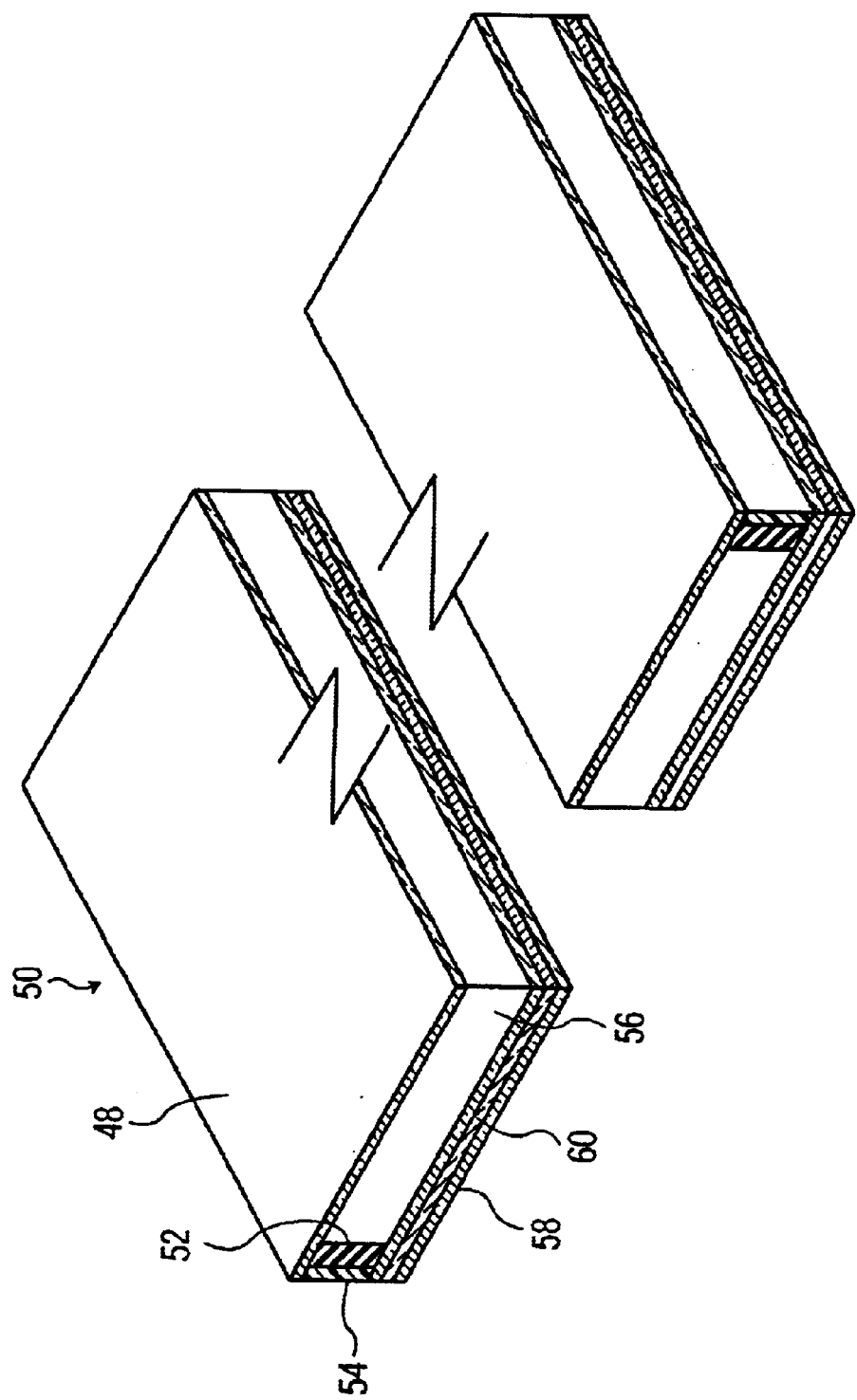
FIG. 2 is a perspective view of a glass assembly that can be used with the break resistant glass door assembly of FIG. 1.

Referring now to FIGS. 1 and 2, one embodiment of glass assembly 16 is shown as an insulated, safety glass assembly, although the present invention is not limited thereby. Specifically, glass assembly 16 includes an outer pane 48 of glass and an inner laminate safety glass assembly 50 separated in parallel spaced apart relation from outer pane 48, and providing a hermetically sealed area therebetween by means of a sealing strip 52, for example, a seal sold by Truseal Technologies of Beachwood, Ohio under the trademark "SWIGGLE." Sealing strip 52 is positioned around the entire periphery of glass assembly 16 but spaced slightly inwardly thereof. The reason is that although sealing strip 52 is intended to provide an air-tight seal, an outer peripheral seal 54 is positioned around sealing strip 52 as a further safety seal in the event that the seal created by sealing strip 52 is broken.

Inner laminate safety glass assembly 50 is a conventional safety glass and includes an outer facing pane 56 of glass, an inner facing pane 58 of glass and a clear polyvinyl sheet 60 sandwiched between outer facing pane 56 and inner facing pane 58, all secured together by a clear adhesive. However, any other suitable safety glass assembly can be used, and the present invention is not limited thereby.

An example of the thicknesses and materials that can be used, are as follows. Outer pane 48 can be a one-eighth inch thick clear tempered glass; outer facing pane 56 and inner facing pane 58 can each be a 3.1 mm thick clear glass; clear polyvinyl sheet 60 can be a 2.48 mm thick polyvinyl sheet; sealing strip 52 and outer peripheral seal 54 can each have a thickness of nine-sixteenths of an inch, with outer peripheral seal 54 being a polyurethane backfill.

Figure 3:
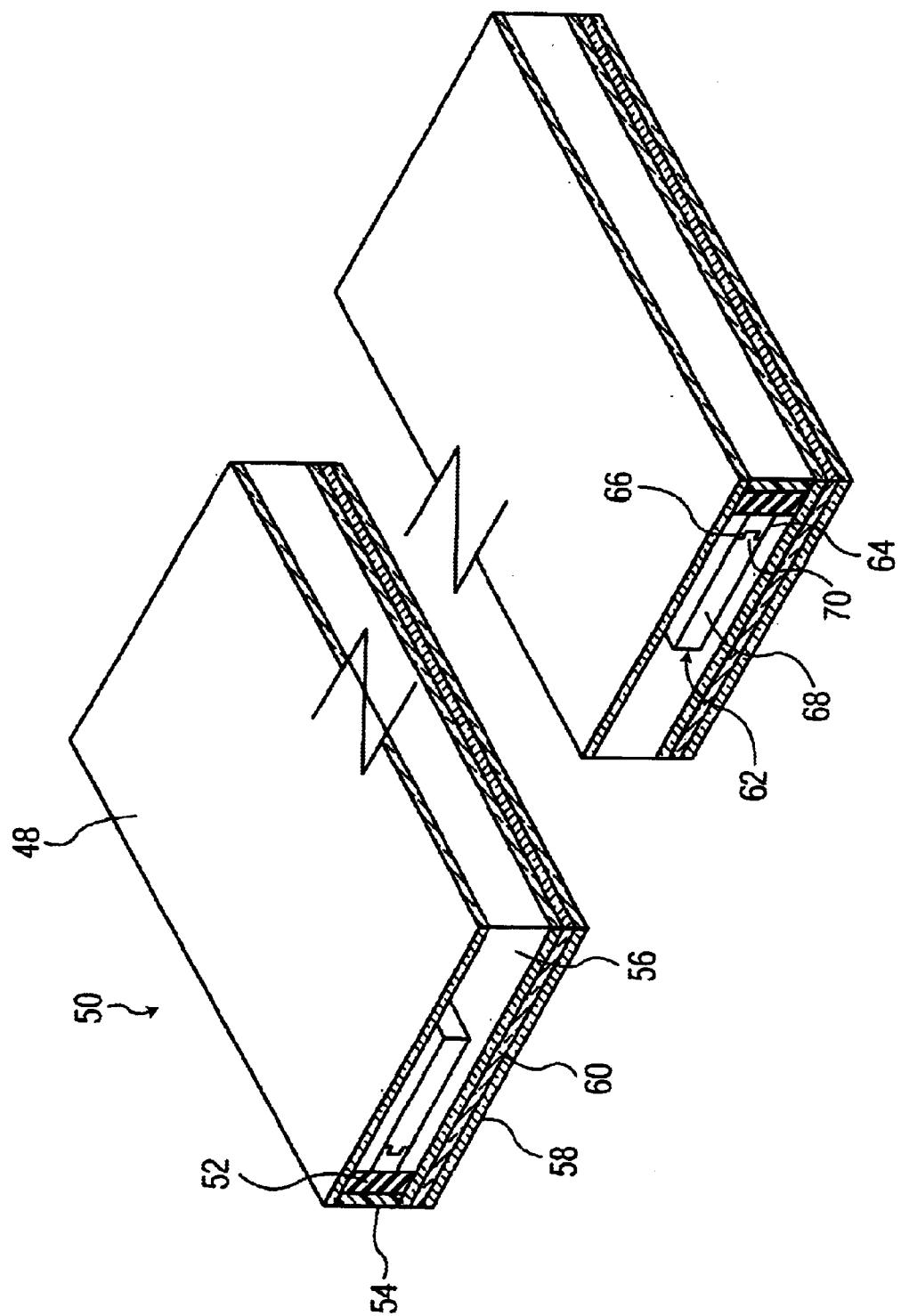
FIG. 3 is a perspective view of a modified glass assembly that can be used with the break resistant glass door assembly of FIG. 1.

FIG. 3 shows a modification of glass assembly 16, in which there is a decorative insert 62 held by a nine-thirty second inch thick brass art box strip 64 secured to the inner surface of sealing strip 52 and having a channel 66 extending therealong. Decorative insert 62 includes a clear panel 68 of the same thickness as box strip 64 and having a pattern (not shown) thereon, and an outer tongue 70 which is secured within channel 66.

Glass assembly 16 is held in place in opening 14 by an outer trim member 72 and an inner trim member 74. Specifically, outer trim member 72 has a substantially inverted T-shaped configuration with a central leg 76 that fits in opening 14 between door assembly 12 and glass assembly 16, a first clamping member 78 that clamps the outer surface of face sheet 18 and a second clamping member 80 that clamps the outer surface of outer pane 48. The inwardly extending edge of central leg 76 includes a plurality of threaded bores 82 therein.

In like manner, inner trim member 74 has a substantially T-shaped configuration with a central leg 86 that fits in opening 14 between door assembly 12 and glass assembly 16, a first clamping member 88 that clamps the inner surface of back sheet 34 and a second clamping member 90 that clamps the inner surface of inner facing pane 58 of glass. A plurality of through holes 92 extend entirely through trim member 74 and specifically through central leg 86.

Therefore, as shown in FIG. 1, outer trim member 72 and inner trim member 74 when assembled together, function to clamp glass assembly 16 in opening 14 of door assembly 12. In such case, central legs 76 and 86 are in alignment and substantially in contact, or in actual contact, with each other, and screws 94 are inserted into through holes 92 and threaded engaged in threaded bores 82 around the entire periphery of outer trim member 72 and inner trim member 74 to clamp glass assembly 16 in opening 14.

It is noted that first clamping members 78 and 88, and second clamping members 80 and 90 have cut-out relief sections 91 therein so that any silicone placed between trim member 72 and 74 and face and back sheets 18 and 34, for sealing purposes, is not forced out, and therefore, structural adhesion is maintained.

The above construction is a known construction. However, such construction did not pass the Dade County PA202 test, and would not have passed the Dade County PA201 and PA203 tests. For example, with the Dade County impact test PA201, the foam material of the door would compress. As a result, glass assembly 16 would pop out from and thereby escape opening 14.

Figure 9:
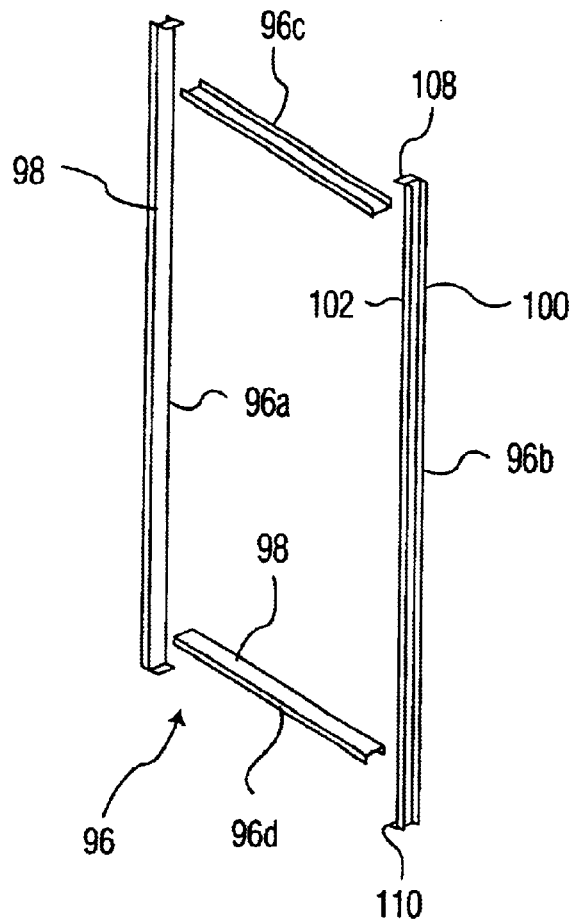
FIG. 9 is a perspective view of the U-shaped cap.
Figure 10:
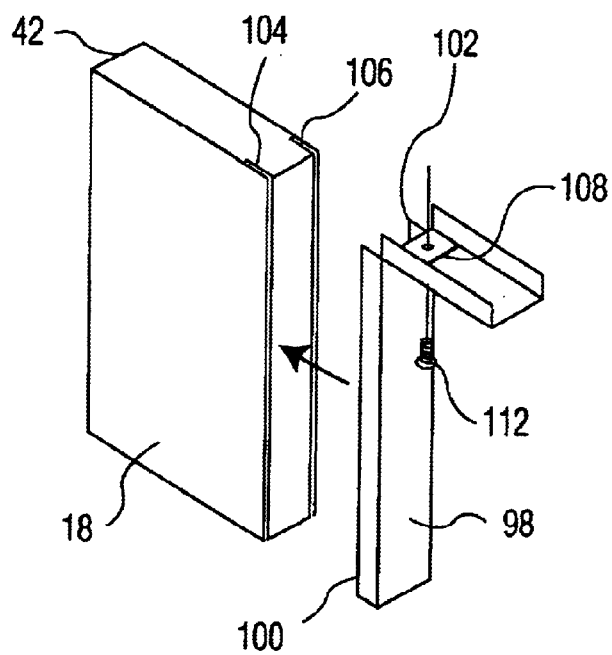
FIG. 10 is a perspective view of a portion of the U-shaped cap being inserted into the door assembly.

Therefore, in accordance with the present invention, a steel U-shaped cap 96 is inserted around molded foam core 42 at opening 14 and positioned under face sheet 18 and back sheet 34. U-shaped cap 96, in cross-section, includes a flush section 98 which sits flush against molded foam core 42 around the entire opening 14 thereof, and two parallel, spaced apart, flange sections 100 and 102 extending outwardly from opposite lengthwise edges of flush section 98. In this regard, as shown in FIGS. 9 and 10, an electric drill with, for example, a 3/16 inch drill bit, is run along the inner perimeter of molded foam core 42 at opening 14, for a depth of approximately one inch to cut channels 104 and 106 therein just beneath face sheet 18 and back sheet 34. When flush section 98 is positioned flush against molded foam core 42 at opening 14, flange sections 100 and 102 are force fit into cut channels 104 and 106, respectively.

U-shaped cap 96 is preferably formed by four sections 96a–96d for the four rectangular sides of opening 14, namely, left and right lengthwise sections 96a and 96b and top and bottom widthwise sections 96c and 96d. The upper and lower ends of lengthwise sections 96a and 96b preferably include inturned tabs 108 and 110 which fit within top and bottom widthwise sections 96c and 96d. Thereafter, screws 112 are inserted through flush sections 98 of top and bottom widthwise sections 96c and 96d and through inturned tabs 108 and 110, into molded foam core 42 to better retain U-shaped cap 96 in position.

Door assembly 10 with this construction was tested under the Dade County tests PA201, PA202 and PA203 and was the first glass door assembly to ever pass all three tests. The reason is that U-shaped cap 96 provides sufficient rigidity to the attachment of glass assembly 16 to door assembly 12, without compression of molded foam core 42, for example, so as to prevent glass assembly from popping out during the impact test and/or buckling and then breaking.

To assemble break resistant glass door assembly 10, after door assembly 12 has been formed and opening 14 has been cut out, door assembly 12 is placed on a table, with outer trim member 72 placed therein and glass assembly 16 placed therein. Then, inner trim member 74 is positioned, as shown in FIG. 1, and screws 94 connect outer trim member 72 and inner trim member 74 together.

Although it has been known to provide U-shaped caps in fire rated doors, this provides a very different arrangement. Specifically, in fire rated doors, which are inner doors, the glass that is used is a fire rated glass, for example, a one-quarter inch wire glass that is heat tempered to withstand a fire rating. However, such glass would not withstand a 2"×4" piece of wood shot out of a canon at 34 mph, and would shatter. Further, the U-shaped cap in such door is to prevent the fire from burning the foam that makes up the door. In such case, face sheet 18 and back sheet 34 would collapse and the door would fail. In hurricane resistant doors, which are outer doors, there is no requirement for a fire rating and one skilled in the art would not consider using a U-shaped cap for such a break resistant glass door assembly since there is no need to worry about fires in such doors, and the fire resistant glass would easily break in hurricane force winds. In like manner, safety glass or break resistant glass would not be used in fire rated doors, since the glass would melt, and particularly, the inner polyvinyl layer of the safety glass would melt.

Figure 11:
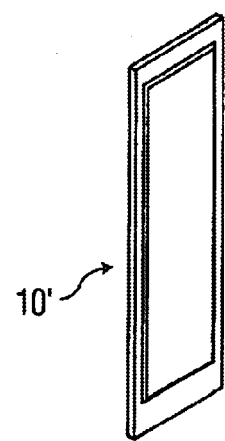
FIG. 11 is a perspective view of a break resistant glass door assembly according to a modified embodiment of the present invention.
Figure 12:
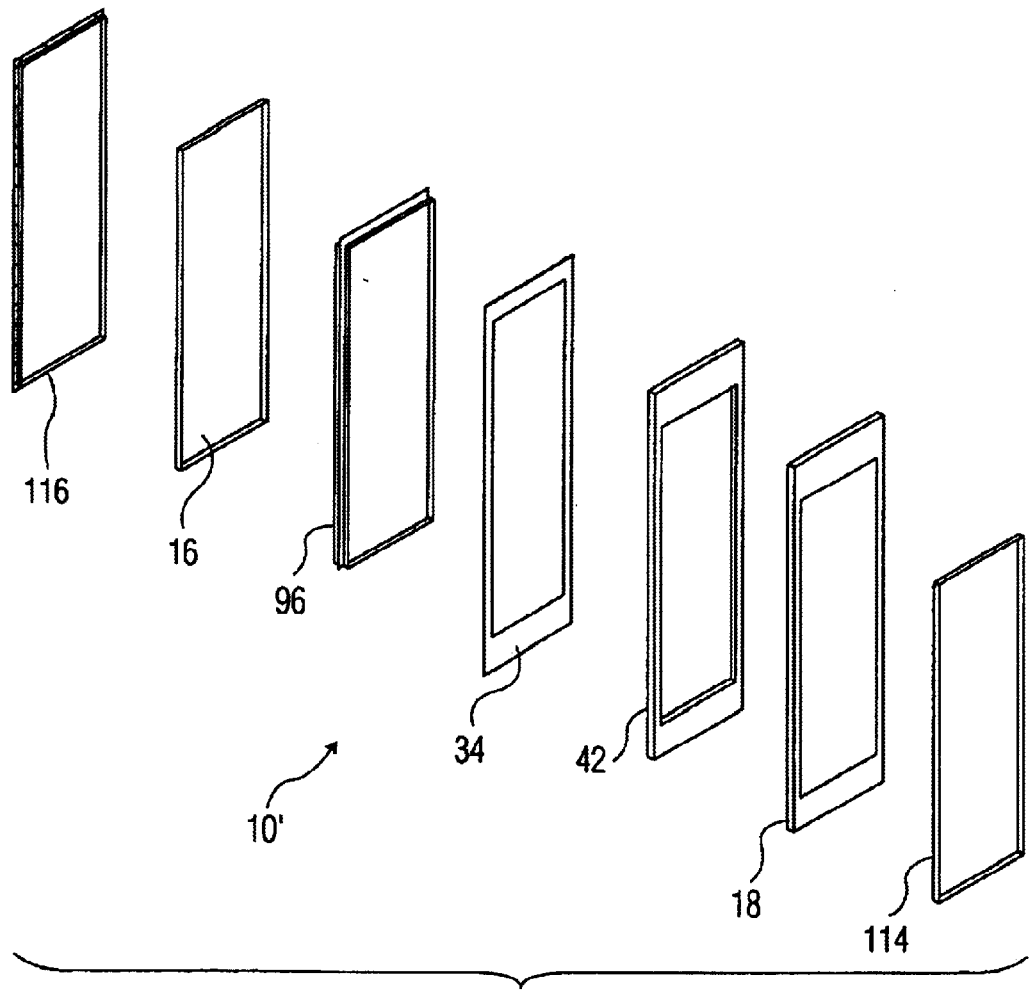
FIG. 12 is an exploded perspective view of a break resistant glass door assembly of FIG. 11.

Referring now to FIGS. 11 and 12, a modified break resistant glass door assembly 10' is shown which is substantially identical to break resistant glass door assembly 10, except that there is a decorative face frame 114 placed over face sheet 18 and a decorative back frame placed over back sheet 34.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention defined by the appended claims.

What is claimed is:

1. A break resistant glass door assembly, comprising:
   a door having an opening an outer surface therein;
   a glass assembly including a laminate safety glass assembly formed by a clear plastic sheet sandwiched between first and second panes of glass said glass assembly further having outer surfaces;
   inner and outer trim members which clamp to said outer surfaces of the safety glass assembly and to the outer surfaces of said door; and
   a rigid U-shaped cap secured to the door around said opening and sandwiched between the door and the trim members.

2. A break resistant glass door assembly comprising:
   a door having an opening therein:
   a glass assembly including a laminate safety glass assembly formed by a clear plastic sheet sandwiched between first and second panes of glass;
   inner and outer trim members which clap the safety glass assembly and door at said opening, to hold the safety glass assembly in the opening of the door; and
   a rigid U-shaped cap secured to the door around said opening said U-shaped cap includes a flush section which sits flush against the door around said opening, and two parallel, spaced apart, flange sections extending outwardly from opposite lengthwise edges of said flush section and which fit around front and back faces of the door at said opening.

3. A break resistant glass door assembly according to claim 2, wherein:
   said door includes a face sheet and a back sheet secured together to define a cavity therein, and a molded foam core in said cavity;
   one said flange section extends between said face sheet and said molded foam core; and
   the other said flange section extends between said back sheet and said molded foam core.

4. A break resistant glass door assembly according to claim 3, wherein said U-shaped cap is formed from different sections, at least some of said sections including an inturned tab for fitting within other ones of said sections.

5. A break resistant glass door assembly comprising:
   a door having an opening therein;
   a glass assembly including a laminate safety glass assembly formed by a clear plastic sheet sandwiched between first and second panes of glass;
   inner and outer trim members which clamp the safety glass assembly and door at said openings, to hold the safety glass assembly in the opening of the door; and
   a rigid U-shaped cap secured to the door around said opening, said U-shaped cap is made from a steel material.

6. A break resistant glass door assembly according to claim 1, wherein said glass assembly further includes at least one pane of glass separated from said safety glass assembly by a gap which is hermetically sealed by a first peripheral seal.

7. A break resistant glass door assembly according to claim 6, wherein said glass assembly further includes a second peripheral seal to an outside of said first peripheral seal for ensuring that said gap remains hermetically sealed in the event of failure of said first peripheral seal.

8. A break resistant glass door assembly comprising:

a door having an opening therein:

a glass assembly including a laminate safety glass assembly formed by a clear plastic sheet sandwiched between first and second panes of glass;

inner and outer trim members which clamp the safety glass assembly and door at said opening, to hold the safety glass assembly in the opening of the door, said inner and outer trim members each include:

a central leg facing each other and positioned in said opening between said glass assembly and said door assembly;

a first clamping member for clamping an exposed surface of said door assembly; and a second clamping member for clamping an exposed surface of said glass assembly; and a rigid U-shaped cap secured to the door around said opening.

9. A break resistant glass door assembly according to claim 8, further comprising a screw extending through the central leg of one of said inner and outer trim members and into the central leg of the other of said inner and outer trim members to secure said trim members together in a clamping relation around said door assembly and said glass assembly.

10. A break resistant glass door assembly according to claim 8, wherein each of said inner and outer trim members has a substantially T-shaped cross-sectional configuration.

* * * * *